Oct. 1, 1963
E. C. THOMPSON
3,105,391
ADJUSTABLE THROTTLE ATTACHMENT
Filed Dec. 24, 1959
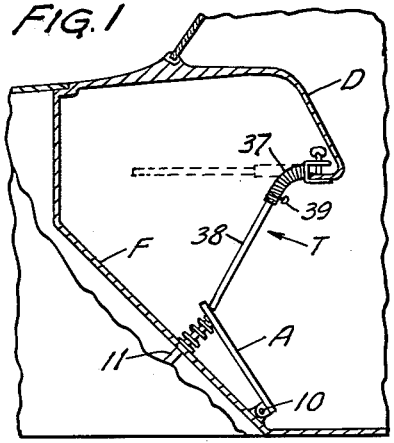
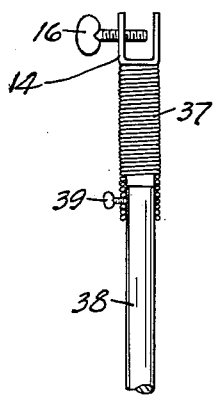
INVENTOR
ERLE C. THOMPSON
BY
Williamson, Schroeder & Palmatier
ATTORNEYS

United States Patent Office 3,105,391
Patented Oct. 1, 1963

3,105,391
ADJUSTABLE THROTTLE ATTACHMENT
Erle C. Thompson, 815 5th St., International Falls, Minn.
Filed Dec. 24, 1959, Ser. No. 861,805
1 Claim. (Cl. 74—532)

This invention relates to a throttle attachment for controlling the accelerator of a vehicle such as an automobile or truck to maintain the engine and/or the vehicle at a constant rate of speed.

Ever since the advent of the modern day automobile and truck, numerous devices have been devised for controlling and maintaining the speed of the automobile constant and for racing the engine when the automobile is idling to test or repair the engine or warm the same quickly during cold inclement weather. Despite the fact that numerous devices of this nature have been invented and placed on the market in the past, none of these devices have become particularly successful or gained general acceptance with the public, which unfavorable reaction has been caused by numerous reasons. Some of the more common reasons for the lack of popularity of the prior art devices and the general lack of acceptance thereof have been the fact that most of them have either been too expensive, complicated, required substantial modification of the automobile for proper installation, normally were unsightly and, one of the most important reasons of all, most of them did not permit the operator to regain control of the automobile and the throttle and accelerator as quickly as desirable to cope with emergencies and unforeseen circumstances which might arise during the course of operation of the vehicle, which last named reason is sufficient in most instances to discourage any serious interest in this type of device.

Therefore, an object of my invention is a device constituting an accessory or attachment for an automobile which is novel in design and operation and simple and inexpensive in construction and readily mounted on and dismounted from a conventional automobile or truck and which is designed to maintain the vehicle and/or the engine thereof at any predetermined constant rate of speed by controlling the movement and extent of actuation of the foot treadle type accelerator mechanism normally found on present-day vehicles.

Still another object is a throttle attachment of the class above described which is adjustable to selectively vary the rate of constant speed desired and is also especially adapted for detachable mounting on the dash board of an automobile or truck and which is conveniently concealed and in an out-of-the-way position and out of sight when not in use and yet is readily available when needed.

Still another object is an accelerator attachment of the class described which is adapted to enable the operator to quickly regain control of the accelerator and throttle immediately and instantaneously and thereby regain control of the vehicle when the occasion arises.

Still another object is a throttle attachment of the class described which is relatively inconspicuous, nonobstructive and unobtrusive even during use so as not to interfere with the other operational devices normally found on the automobile and so as not to interfere with or cause discomfort to the operator himself.

Still another object is a throttle attachment of the class described which is safer, less complicated, and less expensive and more efficient than those devices presently and previously available.

Still another object is an attachment of the class described which is instantaneously releasable from controlling engagement with the accelerator by simple manipulation of the operator's foot.

Still another object is an attachment of the class described which is equally suited for application during extensive periods of travel over roads such as modern day super-highways which enable the vehicles to maintain speed without frequent interruptions and stopping and is equally applicable to situations where the vehicle is not moving and it is desired to race the engine at a constant speed for repair or adjustment purposes or where it is desirable to rapidly warm-up the engine such as during cold weather where the engine has been standing for some time and is cold and stiff prior to starting.

These and other objects and advantages of my invention will more fully appear from the following description made in connection with the accompanying drawings, wherein like reference characters refer to the same or similar parts throughout the several views, and in which:

FIG. 1 is a side elevational view of one form of my invention mounted interiorly of a vehicle; and FIG. 2 is a detail view in partial section on an enlarged scale of the form of my invention shown in FIG. 1.

Reference is now made to the drawings for a more detailed description of a preferred form of my invention as illustrated in the accompanying drawings.

A suitably tensioned tightly wound helically coiled spring member 37 has one end thereof secured to the mounting bracket 14 for attachment to the underside of the dash board D. An elongate accelerator control rod 38 is telescopically inserted into the other end of the spring 37 for relative extending and retracting axial movement with respect thereto. The rod 38 is retained in mounted engagement with the spring by means of a laterally outwardly extending pin 39 carried by the upper end portion of the rod 38 and disposed between the coils of the spring so as to ride thereon and be frictionally held thereby.

To longitudinally adjust the rod 38, the rod is simply turned or rotated about its longitudinal axis. This causes the pin 39 to ride on the coils of the spring and longitudinally move the rod 38 with respect thereto, according to the direction of rotation of the rod.

In use, the rod 38 and spring 37 normally assume the concealed generally horizontal position underneath the dash illustrated by the broken line position of FIG. 1. To control the accelerator by depressing the same and holding the accelerator in said depressed position, the rod 38 is simply grasped in the hand of the operator and swung downwardly to the solid line position of FIG. 1, which is generally perpendicular to the accelerator A, the outer end of the rod 38 frictionally engaging and holding the accelerator in depressed position. The upward force against the rod 38 applied by the spring loaded accelerator A tends to compress the spring 37 and clamp the pin 39 between the coils thereof to prevent movement thereof during use, the frictional engagement between the coils and the pin also assisting in preventing movement of the pin. The downward swinging movement of the rod 38 to accelerator engaging and controlling position causes the spring 37 to bend accordingly, placing the spring under tension and causing it to continuously urge or bias the rod 38 upwardly away from the accelerator. Therefore, to regain control of the vehicle and the accelerator, the operator simply applies downward pressure against the accelerator with his foot. This moves the accelerator out of engagement with the control rod 38 and enables it to immediately swing upwardly to its storage position under the dash under the influence of the spring 37.

From the foregoing, the advantages of my invention are readily apparent. It can be seen that the throttle attachment of my invention is of a type which is simple in construction, inexpensive to make and easy to mount and operate. Because of its location beneath the dash it is out of sight of the average person sitting in the vehicle and at the same time it can be readily reached by the operator, even while driving along the highway, to make use of same. The novel means of frictionally engaging the accelerator and releasing same by simple application of pressure by the toe or foot of the operator against the accelerator to immediately release the throttle attachment from engagement with the accelerator to return complete control of the car immediately to the operator when the circumstances or emergencies dictate, make the use of such a device completely safe to an extent not previously possible by presently available devices and those of the prior art. Although the primary description of this invention has been directed to the use of my attachment to maintain constant speed during highway driving, it is also to be understood that the device is readily adapted and useful for racing or idling the motor at some constant speed while the vehicle remains stationary to repair or adjust the engine or warm the same during cold weather.

It will, of course, be understood that various changes may be made in the form, details, arrangement and proportions of the various parts without departing from the scope of my invention.

What I claim is:

A throttle control device for maintaining the accelerator of a motor vehicle in a predetermined depressed position for maintaining the vehicle engine at a constant rate of speed, said device comprising an elongate control member adapted to have one end thereof engage and depress said accelerator, the other end of said member being telescopically inserted in one end of an elongate helically coiled spring for axial movement relative thereto, a retaining element carried by said other end of said control member extending laterally therefrom and disposed between the coils of said spring for guided movement therebetween upon rotation of said member about its longitudinal axis to longitudinally adjust said member and limiting free relative longitudinal movement between said spring and said member, and means for connecting the other end of said spring to said vehicle above said accelerator, said spring maintaining said member in generally horizontal position above said accelerator when not engaged therewith, and continuously biasing said member away from said accelerator when engaged therewith, said member being released from controlling engagement with said accelerator and swung away therefrom upon depressive movement of said accelerator away from engagement with said member.

References Cited in the file of this patent

UNITED STATES PATENTS

| | | |
|---|---|---|
| 1,595,617 | Raby | Aug. 10, 1926 |
| 2,671,355 | Hawkins | Mar. 9, 1954 |
| 2,716,531 | Johnson | Aug. 30, 1955 |
| 2,785,780 | Paul et al. | Mar. 19, 1957 |
| 2,805,441 | Reder | Sept. 10, 1957 |
| 2,812,669 | Reff | Nov. 12, 1957 |
| 2,866,356 | Elam | Dec. 30, 1958 |
| 2,917,142 | Thorner | Dec. 15, 1959 |

FOREIGN PATENTS

| | | |
|---|---|---|
| 21,082/35 | Australia | Jan. 9, 1936 |
| 137,097 | Australia | May 1, 1950 |